United States Patent [19]

Kennedy et al.

[11] 3,923,759

[45] Dec. 2, 1975

[54] PROCESS FOR THE PREPARATION OF ISOBUTYLENE/BETA-PINENE COPOLYMERS

[75] Inventors: Joseph P. Kennedy, Akron, Ohio; Tom M. Chou, Los Angeles, Calif.

[73] Assignee: The University of Akron, Akron, Ohio

[22] Filed: Nov. 9, 1973

[21] Appl. No.: 414,337

[52] U.S. Cl......... 260/88.2; 260/80 M; 260/88.2 D; 260/93.3
[51] Int. Cl.² ......................................... C08F 210/00
[58] Field of Search ......................... 260/88.2, 80 M

[56] References Cited
UNITED STATES PATENTS

| | | | |
|---|---|---|---|
| 2,335,912 | 12/1943 | Burroughs | 260/80 |
| 2,373,706 | 4/1945 | Ott | 260/80 |
| 3,644,252 | 2/1972 | Shenfeld et al. | 260/27 R |

OTHER PUBLICATIONS

Sivola and Harva, Suomen Kemistilehti, B, 1970, 43, pp. 475–479.

*Primary Examiner*—Joseph L. Schofer
*Assistant Examiner*—A. L. Clingman
*Attorney, Agent, or Firm*—Hamilton, Renner & Kenner

[57] ABSTRACT

Disclosed is a process for the azeotropic copolymerization of isobutylene and beta-pinene including the steps of charging a reaction vessel, substantially free from moisture, with an X mole percent amount of isobutylene and a Y mole percent of beta-pinene with a suitable solvent. The numerical values of X and Y may be any number from about 0.5 to about 99.5 and the sum of X and Y will equal 100 percent. The contents of the reaction vessel are then cooled to about −130°C. and a catalytic amount of precooled catalyst is added thereto. The temperature within the reaction vessel is maintained within a range from about 0.1 hours to about 5 hours so as to form a random copolymer consisting essentially of X mole percent of isobutylene and Y mole percent of beta-pinene. Homopolymers of beta-pinene can also be prepared, in the absence of a catalyst, by heating the monomer in a reaction vessel at a temperature of about 180°C. for a period of time ranging from about 160 hours to about 240 hours. Both processes may be conducted in a continuous manner.

7 Claims, No Drawings

PROCESS FOR THE PREPARATION OF ISOBUTYLENE/BETA-PINENE COPOLYMERS

BACKGROUND OF THE INVENTION

The present invention relates to a process for preparing polymers and copolymers of terpenes such as beta-pinene. Terpenes are commercially available from terpentine or "gum spirits" the average composition being about 60–70% alpha-pinene and 25–35% beta-pinene with smaller amounts of less common terpenes.

Terpene polymers are known and find utility in compositions of pressure sensitive adhesives and hot melt adhesives and coatings. Homopolymers of beta-pinene can be prepared in the presence of aluminum trichloride catalyst at a temperature of about 30°C. to a high of 80°C. as taught by U.S. Pat. No. 2,335,912. These homopolymers are generally amorphous and have a low melting point. Beta-pinene homopolymers have found particular use in pressure sensitive adhesives. However, a crystalline, high melting point beta-pinene homopolymer cannot be prepared according to the aforementioned patent. The crystalline homopolymer has been prepared under gamma ray irradiation and it is useful as a moldable plastic in the manufacturing of household articles and toys. Unfortunately, processes involving gamma ray irradiation are relatively dangerous and costly, and other methods have been heretofore unknown.

Attempts to prepare copolymers of beta-pinene and alkenes such as isobutylene in the presence of aluminum trichloride and other Friedel-Crafts catalysts have been made. The results have been studied for a variety of reasons not the least important of which is the attempt to develop a copolymer with useful rubbery properties as a substitute for more commercially available rubbers. Butyl rubber, for instance, a copolymer of isobutylene and isoprene, is well known, however, some of its undesirable features have been its slow curing rate and its lack of appreciable ozone resistance.

Copolymers of beta-pinene and isobutylene and a method of their preparation are taught by U.S. Pat. No. 2,373,706 whereby the reaction was catalyzed by aluminum trichloride over a broad temperature range of from −70°C. to about 200°C. Although, a variety of physical properties ranging from hard, brittle copolymers to rubber-like copolymers were reported therein, and some of these were stated to be vulcanizable, attempts to duplicate these copolymerizations even under the best conditions taught by that patent, have not been successful in the preparation of any vulcanizable, commercially acceptable products.

Since the issuance of the aforementioned patent in 1945 to the present, the copolymerizations of terpenes, such as beta-pinene, with styrene or isobutylene have been investigated. Two workers in the field, A. Sivola and O. Harva, of the Helsinki University of Technology at Otaniemi, Finland, have attempted the copolymerization of these monomers in methylene chloride, utilizing boron trifluoride and aluminum trichloride as catalysts and at temperatures ranging from −50°C. to +30°C. Their findings have been published in a paper entitled "Polymerization of Terpene Hydrocarbons in the Presence of Styrene and Isobutylene," appearing in *Suomen Kemistilehti B*, 43, 476 (1970). It was their conclusion, utilizing selective solvents and gel chromatography that the products were in reality mixtures of two homopolymers, rather than copolymers of isobutylene and beta-pinene.

Even assuming the copolymerization of isobutylene and beta-pinene is known, it has not been possible to prepare such a copolymer wherein the relative mole percentage of each monomer fed into the reaction vessel remains substantially the same during copolymerization and in the final product. Such a copolymerization i.e., azeotropic, would be desirable because at present it has been necessary to carefully control the feed of each monomer into the reaction vessel since the relative reactivity ratios vary as the conversion of the monomers takes place. Thus, it has not been possible heretofore, to prepare a copolymer comprising X mole percent of isobutylene and Y mole percent of beta-pinene by merely combining X and Y percent of the respective monomers.

SUMMARY OF THE INVENTION

It is, therefore, an object of the present invention to provide a process for the preparation of random isobutylene/beta-pinene copolymers having useful rubbery properties such as excellent ozone resistance and ready vulcanizability and co-vulcanizability with other compounds.

It is a further object of the present invention to provide a process for the preparation of random isobutylene/beta-pinene copolymers having a range of physical properties other than rubbery.

It is yet another object of the present invention to provide a process for the totally unexpected azeotropic copolymerization of isobutylene and beta-pinene, that is, to prepare a copolymer having a composition substantially identical, in terms of mole percent, to the relative mole percent of isobutylene and beta-pinene monomers fed into the reaction vessel.

It is a still further object of the present invention to provide a feasible process, in terms of safety and economics, for the preparation of crystalline homopolymers of beta-pinene having a higher melting point than presently known amorphous homopolymers.

It is yet another object of the present invention to provide new and useful copolymers of isobutylene and beta-pinene as well as new and useful co-vulcanization of the copolymer and unsaturated rubber compounds, and a new and useful homopolymer of beta-pinene.

These and other objects of the present invention and method will become apparent from the following specification and claims.

In general, a process for the azeotropic copolymerization of isobutylene and beta-pinene is accomplished by the following steps. A suitable reaction vessel is first prepared by eliminating substantially all moisture. The vessel is next charged with an X mole percent amount of isobutylene and a Y mole percent amount of beta-pinene and a suitable solvent. The numerical values of X and Y may be any number from about 0.5 to about 99.5 and the sum of X and Y will equal 100 percent. The contents of the reaction vessel are then cooled to about −130°C. and a catalytic amount of precooled catalyst is added thereto. The temperature within the vessel is maintained within a range of from about −130°C. to about −100°C. for a period of time ranging from about 0.1 hours to about 5 hours so as to form a copolymer consisting essentially of X mole percent of isobutylene and Y mole percent of beta-pinene. It should be apparent to one having ordinary skill in the art that this process may be conducted in a continuous manner.

Homopolymerization of beta-pinene may also be accomplished by heating beta-pinene in a reaction vessel at a temperature of about 180°C. for a period of time ranging from about 160 hours to about 240 hours. At the end of this time a crystalline homopolymer of beta-pinene is formed and may be extracted from the contents of the reaction vessel by conventional methods. Crystalline beta-pinene homopolymers prepared according to this method have a melting point of about 180°C. and may be utilized as a moldable plastic in the manufacturing of household articles and toys.

Copolymers of isobutylene and beta-pinene, prepared according to the preferred method herein, may contain from about 30 mole percent to about 99 mole percent of isobutylene and about 1 mole percent to about 70 mole percent of beta-pinene so that the sum of the relative percentages of the monomers will equal 100 percent. Moreover, during the conversion of the monomers into the copolymer, according to the preferred method, the relative percentage of isobutylene and beta-pinene fed into the reaction vessel is essentially the same as the percentages of each in the copolymer product. Although attempts to prepare copolymers having from about 1 to 30 mole percent of isobutylene according to the preferred method herein have not been made, it is believed that such ratios will also combine azeotropically with beta-pinene if desired.

As will be appreciated by those skilled in the art, copolymers having a low percentage of weight of isobutylene, i.e., 1 to about 10 percent, will generally form hard copolymers having a number average molecular weight range of from about 3000 to about 20,000. As the amount of isobutylene is increased to about 30%, the copolymer becomes leathery, and as the percentage increases up to 90% the copolymer becomes more flexible and is useful in sealing and caulking applications. When the amount of beta-pinene is relatively low, i.e., 0.5 to about 10 percent, the copolymers exhibit rubber-like properties and have a viscosity average molecular weight of from about 2,000,000 to about 100,000, respectively.

Particularly useful are the rubbery copolymers having a composition range of about 90 to about 99.5 mole percent isobutylene and about 0.5 to about 10 mole percent beta-pinene and a viscosity average molecular weight range of about 100,000 to about 2,000,000. Rubbery copolymers may be defined for present purposes as those whose second order glass transition temperature is below about −50°C. These copolymers have been found to exhibit excellent ozone resistance, to be readily cured, and to be uniformly vulcanized because the copolymerization is random. They can also be successfully co-cured with highly unsaturated rubbers such as cis 1,4-polybutadiene, SBR rubber and natural rubber, with several advantages, among others, to improve the ozone resistance of those compounds. They can also be used to form blown sponge and as coatings for high voltage cables.

Copolymer compositions are determined by reactivity ratios. The monomer reactivity ratios depend upon the electronic and geometric structure of the monomers and are usually quite different. Generally, a higher reactivity ratio indicates a more reactive monomer and correspondingly, a lower reactivity ratio indicates a less reactive monomer. Because the reactivity ratio of monomers is different, careful control of monomer concentrations in the feed is necessary to obtain the desired copolymer composition. In certain instances, the reactivity ratio of monomers may be equal to one. It is then that the feed composition and copolymer composition will be identical. The attainment of azeotropic copolymerization conditions is extremely desirable because it allows the copolymerization to proceed to high conversions while maintaining a constant copolymer composition. In industrial practice, azeotropic, or ideal copolymerizations, are valuable inasmuch as process control is greatly simplified thereby.

It has now been discovered, as depicted in Table I below, that the ideal or azeotropic copolymerization of isobutylene and beta-pinene can be effected by lowering the temperature of the reactants. Such an effect is totally unexpected and is surprising because generally, according to the science of copolymerization, lowering the temperature does not necessarily result in azeotropic copolymerization combinations. Indeed, according to the theory advanced by Turner Alfrey, Jr., John J. Bohrer and H. Mark in *High Polymer Vol. VIII Copolymerization* published by Interscience Publishers, New York, 1952, by increasing the temperature, one may obtain azeotropic copolymerization conditions.

Table I presents a series of 6 copolymerizations of isobutylene and beta-pinene in the solvent ethyl chloride and utilizing ethylaluminum dichloride as a catatlyst. As observed and recorded, the reactivity rates of both monomers varied with a decrease in temperature until about −110°C. Thereafter, the reactivity ratios remained equal to about 1. Correspondingly, the mole percent of isobutylene in the feed and in the copolymer remained approximately the same when the reactivity ratios of both monomers were alike.

TABLE I

| Run | Temperature | Mole Fraction of isobutylene in Feed | Mole Fraction of isobutylene in Copolymer | Reactivity Ratio of isobutylene | Reactivity Ratio of beta-pinene |
| --- | --- | --- | --- | --- | --- |
| 1 | −50°C. | 0.6 | 0.30 | 0.27 | 3.0 |
| 2 | −78°C. | 0.6 | 0.44 | 0.52 | 1.9 |
| 3 | −100°C. | 0.6 | 0.50 | 0.77 | 1.5 |
| 4 | −110°C. | 0.6 | 0.61 | 1.0 | 0.95 |
| 5 | −120°C. | 0.6 | 0.60 | 1.0 | 1.0 |
| 6 | −130°C. | 0.0 | 6.59 | 1.0 | 1.0 |

DESCRIPTION OF THE PREFERRED EMBODIMENT

The preferred terpene monomer which has been found to copolymerize azeotropically with isobutylene is beta-pinene. Both monomers are preferably highly purified grade compounds in order to minimize any side reactions. The reaction vessel is first prepared by removing substantially all of the moisture therefrom which is readily achieved by providing an inert atmosphere such as nitrogen. The monomers are then combined with a solvent and are thoroughly mixed within the reaction vessel at a temperature of about −78°C.

As stated hereinabove, one of the objects of the invention according to the preferred method, is to promote the azeotropic copolymerization of the monomers, thereby simplifying feed ratio determinations and controls. If, for example, a relatively hard copolymer substance is desired, as little as about 1 to about 20 mole percent of isobutylene is mixed with from about 80 to about 99 mole percent of beta-pinene. Similarly, if a relatively flexible copolymer substance is desired, the beta-pinene mole percent amount may be as low as about 1 to about 20 percent, while the isobutylene mole percent amount is increased to about 80 to 99 percent. It has been found that when the copolymerization reaction is carefully controlled, pursuant to the preferred method described herein, that the monomers will combine azeotropically in all ratios from about 30 to 99 percent of isobutylene, or X percent, and from about 1 to 70 percent of beta-pinene, or Y percent, where the sum of X and Y totals 100 percent. As indicated hereinabove, it is expected that the azeotropic copolymerization will occur with even greater amounts of beta-pinene, such as from 70 to 99 percent.

The solvents which may be conveniently employed include inert polar solvents, e.g., methyl chloride, ethyl chloride, methylene chloride, chlorobenzene, and 1,2-dichloroethane and inert non-polar solvents e.g., propane, pentane, hexane, toluene, cyclohexane, carbon disulfide and all mixtures thereof. The preferred solvent is ethyl chloride.

After the monomers and solvent are thoroughly mixed and cooled, the temperature is further reduced to about −130°C. and the catalyst is added. The following catalysts can be used to promote the azeotropic copolymerization of isobutylene and beta-pinene: ethylaluminum dichloride, aluminum trichloride, boron trifluoride, titanium tetrachloride, tin tetrachloride, vanadium tetrachloride, antimony pentafluoride, tungsten hexachloride and ferric chloride. Ethylaluminum dichloride is generally the preferred catalyst.

The catalyst solution is admitted to the reaction vessel dropwise while maintaining the temperature therein between −130°C. and −100°C., said low temperature range being one of the crucial variables essential to the desired azeotropic copolymerization. The mole percent of catalyst utilized with respect to the moles of monomer used is from about 0.0001% to about 10% with 0.001% to 0.1% being preferred. Of course, the mole amount of catalyst will control the yield of the copolymer and if it be desired to convert substantially all of the monomers within the reaction vessel to the copolymer, the volume amount of catalyst solution utilized need only be increased. After a period of about 0.1 to about 2 hours, the polymerization reaction is terminated by the addition of a solution of methanol in ethyl chloride. The copolymer, which has formed as a white precipitate is then removed by any conventional method.

It has also been found possible to polymerize pure beta-pinene to form a crystalline structure having a high melting point, i.e., about 180°C. The beta-pinene monomer is introduced into a reaction vessel which is then capped. The reaction vessel is thereafter heated to a temperature of about 180°C. for a period of time from about 160 hours to about 240 hours. After the white, beta-pinene polymer has been formed it is removed from the reaction vessel and washed with chloroform.

The following examples 1–10, recite the preparation of isobutylene/beta-pinene copolymers according to the preferred method wherein an azeotropic combination of the monomers was effected. All copolymerizations were run under a nitrogen atmosphere, at a temperature range carefully maintained between about −130°C. to about −110°C. and at atmospheric pressure and with a moisture content of less than 100 ppm.

For Examples 1–6 the viscosity average molecular weight has been determined and set forth hereinbelow. The viscosity average molecular weight $\overline{M}_v$ was obtained by determining the intrinsic viscosity of $[\eta]$ of the copolymer product and applying the equation of P. J. Flory derived for polyisobutylene which is $$\ln \overline{M}_v = 12.48 + 1.565 \ln[\eta]$$

and which appeared in the *Journal of the American Chemical Society*, 65 372 (1943), "Molecular Weights and Intrinsic Viscosities of Polyisobutylenes." The intrinsic viscocity was measured using diisobutylene solvent at 20°C. and a Ubbelohde viscometer.

Examples 11–15 are presented in Table IV indicating the effect on the desired azeotropic copolymerization when the temperature or catalyst is changed.

Example 16 was run in an attempt to prepare an isobutylene/beta-pinene copolymer expected to have good rubbery properties, without following the preferred method described herein. Unlike Examples 11–15, a compositional analysis was not made, rather the product was physically examined and determined not to possess any useful rubbery properties.

Example 17 presents a co-vulcanization product of an isobutylene/beta-pinene copolymer, prepared according to the preferred method herein, and butadiene rubber.

Example 18 recites the preparation of a crystalline, beta-pinene polymer, without utilization of a catalyst.

EXAMPLE 1

Into a suitable reaction vessel was charged a mixture consisting of 1000 ml. or 12.7 moles, approximately 97%, of isobutylene; 61.5 ml. or 0.39 moles, approximately 3%, of beta-pinene, and 2830 ml. of ethyl chloride as a solvent. The contents were thoroughly mixed within the vessel at −78°C. The temperature was thereafter lowered to −130°C. and a precooled catalyst solution consisting of ethylaluminum dichloride 0.5% by volume in ethyl chloride was added dropwise into the reaction vessel. The amount of catalyst introduced was about 200 ml., i.e., about 0.015 mole percent of ethylaluminum dichloride with respect to the monomers. All reactants were constantly stirred while the catalyst solution was added. At the end of 46 minutes, a 30% solution of ethyl chloride in methanol was precooled to −130°C. and admitted to the reaction vessel to terminate the copolymerization. The copolymer, a white precipitate, was dissolved in n-pentane, reprecipitated in methanol, then dried in a vacuum oven at 40°C. and weighed. Upon analysis, the conversion rate of 21% was established and the composition of the copolymer was found to be approximately 3.1 ± 0.3% beta-pinene. Viscosity average molecular weight was approximately 650,000.

EXAMPLE 2

The same ratios of monomers and solvent as in Example 1 were combined in a reaction vessel and copolymerized by the same catalyst solution except a 0.2% concentration by volume was substituted, i.e., 60 ml. or about 0.0077 mole percent of ethylaluminum dichloride with respect to the monomers. At the end of 40 minutes the white copolymer formed was removed, washed and dried. Upon analysis, the conversion rate of about 5.2% was established and the composition of the copolymer was again found to be about 3.1% beta-pinene. Viscosity average molecular weight was approximately 2,000,000 and $T_g = -65°C$.

This copolymer was cured at 160°C. for 35 minutes and found to exhibit the following physical properties:

| | |
|---|---|
| tensile strength | 3500 psi |
| 300% modulus | 110 psi |
| elongation at break | 1000% |
| permanent set | 12% |

The copolymer was also tested with natural rubber and butyl rubber. Cut dumbells of each cured compound were stretched to 100% elongation and placed in a glass chamber and exposed to a constant flow of ozone having a concentration of about 140,000 pphm. The natural rubber crumbled after several minutes, the butyl rubber broke after 2 hours and the isobutylene/-beta-pinene copolymer was virtually uneffected after 5 hours.

Following the same general procedure as set forth in Examples 1 and 2, Examples 3 through 6 were copolymerized utilizing varying amounts of monomers. The results have been set forth in Table II below.

In Examples 11 and 12 different temperatures were substituted and in Examples 13 through 15 the catalyst and the temperature were varied. The results, presented in Table IV, indicate that azeotropic copolymerization was not obtained.

TABLE IV

| Example | Catalyst | Temperature | beta-pinene Monomer in charge, mole % | beta-pinene in Copolymer, mole % |
|---|---|---|---|---|
| 11 | ethylaluminum dichloride | −50°C. | 40 | 70 |
| 12 | ethylaluminum dichloride | −78°C. | 40 | 56 |
| 13 | boron trifluoride | −70°C. | 40 | 60 |
| 14 | boron trifluoride | −100°C. | 10 | 6.0 |
| 15 | aluminum trichloride | −60°C. | 20 | 41.0 |

EXAMPLE 16

Into a suitable reaction vessel was charged a mixture of 95.42 mole % of isobutylene and 4.58 mole % of beta-pinene with ethyl chloride as a solvent. The monomers were reacted in the presence of aluminum trichloride as a catalyst, at −60°C. and for approximately 15 minutes. At the end of this time, the reaction product was separated from the vessel. Although the monomer concentrations were carefully determined, so as to form a copolymer with good rubbery properties, the product obtained could best be described as a guey, highly viscous mass which could not be milled, compounded or vulcanized. Analysis was not attempted because in Example 15 it has been established that these monomers do not combine azeotropically in the presence of aluminum trichloride at −60°C.

EXAMPLE 17

To illustrate the co-vulcanization capability of the isobutylene/beta-pinene copolymer a sample prepared according to Example 3, i.e., about 10% beta-pinene

TABLE II

| Example | beta-pinene Monomer in Charge, mole % | isobutylene Monomer in Charge, mole % | Solvent | Catalyst - Concentration Volume % | Catalyst - ml. | Time min. | Viscosity Average Molecular Weight | Conversion % | $T_g$ | beta-pinene in Copolymer, mole % |
|---|---|---|---|---|---|---|---|---|---|---|
| 3 | 10 | 90 | ethyl chloride | 0.5 | 120 | 138 | 92,000 | 19 | −53°C. | 10 |
| 4 | 20 | 80 | " | 0.3 | 100 | 28 | 27,000 | 4 | −28°C. | 18 |
| 5 | 40 | 60 | " | 0.2 | 100 | 22 | 10,000 | 2.4 | +20°C. | 41 |
| 6 | 70 | 30 | " | 4.0 | 10 | 10 | 5,000 | 20 | — | 69 |

Examples 7 through 10 were conducted similar to Examples 1 through 6 except for the substitution of aluminum trichloride as the catalyst and methyl chloride as the solvent. Comparison of the mole percent of beta-pinene monomer and the percent of beta-pinene in the copolymer is set forth in Table III below.

TABLE III

| Example | beta-pinene Monomer in charge, mole % | isobutylene Monomer in charge, mole % | beta-pinene in Copolymer, mole % |
|---|---|---|---|
| 7 | 10 | 90 | 9 |
| 8 | 20 | 80 | 18 |
| 9 | 40 | 60 | 41 |
| 10 | 60 | 40 | 58 | was compounded with butadiene rubber as follows in terms of parts by weight:

| | |
|---|---|
| isobutylene/beta-pinene copolymer | 30 |
| butadiene rubber | 70 |
| HAF black | 40 |
| stearic acid | 1 |
| zinc oxide | 5 |
| santocure | 1 |
| DPG | 1 |
| sulfur | 1.5 |

After curing the mixture for 30 minutes at 160°F., the vulcanizate was tested and found to possess a tensile strength of 2,500 psi and an elongation of 300%.

EXAMPLE 18

A suitable reaction vessel was charged with 5 ml. of beta-pinene having a purity of about 87%. The vessel was then sealed and heated to a temperature of about 180°C. for approximately 170 hours. At the end of this time a white polymer had formed which was subsequently extracted and washed in chloroform. The polymer was found to be insoluble in chloroform, pentane, benzene and chlorobenzene, but soluble in betapinene, mineral oil and in decalin heated to about 180°C. The polymer was also found to show crystallinity by X-ray. Upon heating, it began to soften at about 180°C. and flowed freely at about 210°C.

It can be seen that the disclosed invention carries out the objects of the invention set forth above. As will be apparent to those skilled in the art, many copolymers can be prepared without departing from the spirit of the invention herein disclosed and described, the scope of the invention being limited solely by the scope of the attached claims.

We claim:

1. A process for the azeotropic copolymerization of isobutylene and beta-pinene comprising the steps of: preparing a reaction vessel so as to remove substantially all moisture, charging said reaction vessel with an X mole percent amount of isobutylene and a Y mole percent amount of beta-pinene, and a suitable solvent wherein X and Y each may be any number from about 0.5 to about 99.5, the sum of X and Y equalling 100 percent, cooling the contents of said reaction vessel to about −130°C., adding a catalytic amount of a precooled catalyst, and maintaining said temperature within a range of from about −130°C. to about 110°C. for a period of time sufficient to form a random copolymer consisting of X mole percent of isobutylene and Y mole percent of beta-pinene.

2. A process for the azeotropic copolymerization of isobutylene and beta-pinene as in claim 1, wherein said solvent is selected from the class consisting of methyl chloride, ethyl chloride, methylene chloride, chlorobenzene, 1,2-dichloroethane, propane, pentane, hexane, toluene, cyclohexane, carbon disulfide and mixtures thereof.

3. A process for the azeotropic copolymerization of isobutylene and beta-pinene as in claim 1, wherein said catalyst is selected from the class consisting of ethylaluminum dichloride, aluminum trichloride, boron trifluoride, titanium tetrachloride, tin tetrachloride, vanadium tetrachloride, antimony pentafluoride, tungsten hexachloride, and ferric chloride.

4. A process for the azeotropic copolymerization of isobutylene and beta-pinene as in claim 1, wherein said catalytic amount of catalyst added ranges from about 0.0001 mole % to about 10 mole %.

5. A process for the azeotropic copolymerization of isobutylene and beta-pinene as in claim 1, wherein X is a number from about 30 to about 97 and Y is a number from about 3 to about 70.

6. A process for the azeotropic copolymerization of isobutylene and beta-pinene as in claim 1, wherein said period of time ranges from about 0.1 hours to about 5.0 hours.

7. A composition of matter comprising: a random copolymer having a viscosity average molecular weight of from about 100,000 to about 2,000,000, and having from about 90 mole % to about 90.5 mole % of isobutylene and from about 0.5 mole % to about 10 mole % of betapinene.

* * * * *

UNITED STATES PATENT OFFICE
CERTIFICATE OF CORRECTION

PATENT NO. : 3,923,759
DATED : December 2, 1975
INVENTOR(S) : Joseph P. Kennedy and Tom M. Chou It is certified that error appears in the above-identified patent and that said Letters Patent are hereby corrected as shown below:

Columns 3-4, Table 1: In Run No. 6, second column, "0.0" should read -- 0.6 --; third column, "6.59" should read -- 0.59 --.

Column 9, line 35, "110°C." should read -- -110°C. --.

Column 10, line 33, "90.5" should read -- 99.5 --.

Signed and Sealed this sixth Day of April 1976

[SEAL]

Attest:

RUTH C. MASON
*Attesting Officer*

C. MARSHALL DANN
*Commissioner of Patents and Trademarks*